July 11, 1939. W. W. DODGE Re. 21,144

REFRIGERATING LETTUCE AND THE LIKE

Original Filed Jan. 21, 1937

INVENTOR.
Wesley Dodge

BY Robert H. Eckhoff
ATTORNEY.

Reissued July 11, 1939

Re. 21,144

UNITED STATES PATENT OFFICE 21,144

REFRIGERATING LETTUCE AND THE LIKE

Wesley W. Dodge, Oakland, Calif., assignor to Paterson Pacific Parchment Co., a corporation of California Original No. 2,124,412, dated July 19, 1938, Serial No. 121,574, January 21, 1937. Application for reissue March 27, 1939, Serial No. 264,473

6 Claims. (Cl. 62—15)

This invention relates to the refrigeration of perishable commodities, fruit, vegetables and the like, and the preparation and packing thereof for market. The invention is particularly applicable to lettuce and it will therefore be described in that connection although it is not limited to use with lettuce.

Lettuce and other vegetables are planted so that subsequently they can be harvested substantially continuously throughout the year to provide a steady supply for the market. However, uniform conditions do not maintain the year round, and the vegetables are consequently subject to different climatic conditions which affect the texture, color, solidity and appearance of the product.

With lettuce, diseases of the field as well as effects occasioned by the elements are factors affecting quality. The most common of the field diseases is that known as tip burn, but bruising, frost injury, worm injury and wind burn also serve to depreciate the lettuce quality. Depending upon the time of the year, the lettuce is subject to one or more of these. Bruising of the lettuce, of course, occurs between the cutting of the lettuce and its final packing.

The lettuce is ordinarily cut and then transported to the packing shed. The space of an hour often suffices for the preparation and packing of an entire carload of lettuce containing over three hundred crates of lettuce. Rapid handling is therefore the practice. Since the labor employed does not distinguish between haste and speed, the lettuce suffers by being roughly handled and bruised. Many bruises do not appear on the lettuce until some time after it is packed.

In the packing shed, the lettuce is trimmed, the outer surface leaves being removed and the lettuce sorted for size and quality. It is then placed in a crate, being jammed in to provide a certain number of heads in each layer, depending upon the size. A layer of snow ice is then placed directly upon the packed layer of lettuce. In some instances, intervening fillers are placed between the layers, as in the Grande Patent No. 1,895,319, of January 24, 1933, and the Gallagher Patent No. 1,828,179 of October 20, 1931. As appears in both these patents, crushed ice is placed directly in contact with the lettuce.

It is an observation pertinent to the present invention that when lettuce is packed as aforementioned (with the ice in direct contact with the lettuce) tip burn, bruises, frost injury, worm injury, and wind burn turn to slime, an advanced stage of decomposition of weakened vegetable tissue. This slime in and of itself is very objectionable, and the lettuce must be entirely retrimmed upon unpacking. This trimming must be severe because the slime works into the head. With mature lettuce I have also observed that to a great extent the direct ice pack results in rib cracking. That is, the ribs in each leaf crack open.

With lettuce packed as in the Gallagher and Grande patents, even though the butts of the lettuce are up, the lettuce becomes water-logged. The undesirability of this is apparent when it is remembered that after lettuce has been purchased by a retailer, it is sorted over, retrimmed and put on display. At the same time it is sprinkled with water to freshen it and give it an improved appearance. Water-logged lettuce will not respond to the additional water to any great extent and will not freshen up, at least to an extent comparable with that of lettuce shipped in accordance with the present invention.

I have found that if lettuce is shipped in a cold condition but in such a manner that the water in contact with the lettuce is minimized and regulated, the appearance of slime from tip burn, bruises, frost and worm injury and from wind burn will not occur to the extent nor nearly as readily; furthermore, lettuce packed in accordance with the present invention is substantially free of rib cracking, while the lettuce will freshen up very materially when placed upon a retailer's shelf and sprinkled with water.

I have found that while all moisture contact with the lettuce should not be eliminated, it should be materially restricted. Thus, it is impossible to pack lettuce successfully in wrappers which in and of themselves, or because of their arrangement, exclude moisture entirely, and I have found that lettuce cannot be successfully packed in sheet rubber in the manner of the Davis Patent No. 112,129, of February 28, 1871, nor in the paraffine paper wrappers in the manner of the Dujardin Patent No. 1,018,812 of February 27, 1912, because these are either inherently waterproof, or are so arranged in their respective containers as to exclude water and moisture as well. I have found that I must use a shielding material which is substantially waterproof but which will nevertheless, because of its inherent properties, permit moisture to pass to the lettuce so that when the wrapper is placed around a head or heads of lettuce and ice is placed about the exterior of the wrapper, the melting ice is effective to pass moisture to the lettuce and maintain within the wrapper and about the encased heads of lettuce a cold but humid atmosphere.

At this point it is possibly well to point out that there is a difference between materials which are substantially waterproof, and materials which are waterproof and yet permeable to water in the form of vapor or moisture. This distinction is not new with me, so far as the distinction is concerned, but is an important one insofar as the present invention is concerned. The wrappers which I employ maintain their integrity in the presence of moisture and do not permit water to pass as such. While they are slightly pervious to moisture, they obstruct water passage. In effect, therefore, my wrappers are waterproof but not moistureproof.

As suitable shielding materials I have found I can use any wrapping material which is substantially waterproof and which will nevertheless permit moisture to pass to an extent sufficient to maintain within it, when used as a wrapper, a humid atmosphere. As particular materials, I have successfully used those produced by the Paterson Parchment Paper Company and known to the trade as "Patapar" and "Durapak". These materials are sometimes characterized as vegetable parchments. Of course, any other suitable paper can be used, as can any wrapping material which is substantially waterproof and which is nevertheless permeable to moisture or arranged so that moisture can pass to the lettuce. The paper or wrapper should be tough; at least its strength should not disappear when it is soaking wet.

The present invention enables the shipper of lettuce to use ice that comes directly from the ice manufacturing plant or ice storage without leaving it standing to warm up or "thaw out". The majority of lettuce shippers are not aware of the fact that commonly ice is colder than 32°, and, being unaware of this, place the ice in direct contact with the lettuce immediately after receiving the ice, thereby causing the outer leaves of the head to show freezing injury.

Ice is frequently delivered at temperatures ranging from 15° to 20° F., with an average delivery temperature at the packing house of about 24° F. This low temperature is detrimental to the lettuce if placed in direct contact therewith. Therefore, in accordance with the present invention, the lettuce shield checks the cold sufficiently and for a period that is long enough to allow the ice to warm up whereby the lettuce does not show freezing injury. As the ice melts, the water follows the shield or wrapper and at no time does the super-cold ice or cold ice water touch the bulk of the lettuce under this invention. Under the method practiced today, as the cold ice melts the lettuce absorbs the water and the super-cold ice is always next to the lettuce. This results in the outer leaves of the lettuce freezing, resulting in an early decay in transit.

It is in general the broad object of the present invention to provide a new and improved method of packing head lettuce for shipment to market. The invention is not, of course, limited to lettuce, although it is particularly applicable to this commodity. Many fresh fruits and vegetables can be advantageously handled according to the present invention.

Another object of the present invention is to provide a packing for lettuce such that the lettuce does not become waterlogged.

Another object of the present invention is to provide an improved packing for certain vegetables enabling the vegetables to be delivered to the market in a comparatively fresh condition so that they are easily revivified and freshened.

The invention includes other advantageous features and objects, some of which, together with the foregoing, will appear hereinafter, wherein the present preferred manner of practicing the invention is disclosed.

In the drawing accompanying and forming a part hereof,

Numeral 6 designates a suitable lettuce crate. In this crate are packed the various tiers of lettuce. Each tier can include a certain number of lettuce heads, either 16, 20 or 25 heads, depending upon the size of the lettuce. Each tier of the heads is shielded by a suitable wrapper 1. This wrapper is made of any of the materials which I have previously discussed. I have used with success the "Durapak" or "Patapar" papers previously mentioned, although other wrappers can be used, providing they are substantially waterproof and are either inherently permeable to moisture or are arranged so that the lettuce within the wrapper is supplied with a limited amount of moisture.

Figure 5:
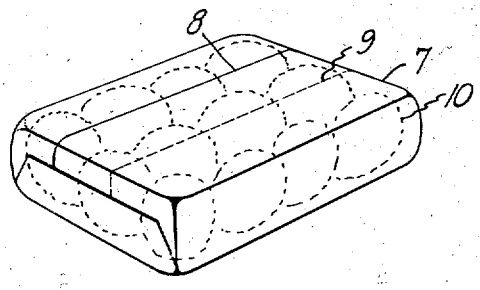
Figure 5 is a perspective view of a lettuce pack.
Figure 6:
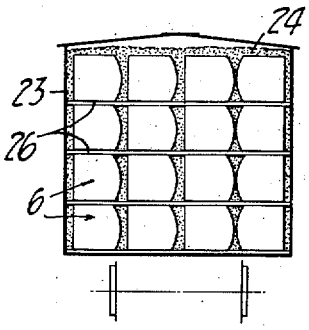
Figure 6 is a cross-section on the line 6—6 of Figure 1.

Referring to Figure 5, it is to be noted that the paper is folded over and overlaps so that draining of the water into the package is prevented; thus in Figure 5 I have shown one end 8 overlapping the other end 9 for a considerable distance on the upper side 10 of the pack. It is also to be noted that the end sections are tucked over as at 14. Instead of using a sheet, a sack or bag can be used, but I consider a sheet satisfactory.

The shielding of the lettuce can either be performed by hand or by machine, and within or without the crate. I prefer to position the paper and then place the lettuce thereon, folding the paper and tucking in the ends. The packed lettuce is then placed in the crate. A layer of ice, indicated as 11, is then placed upon the wrapped package. This operation is repeated, the wrapped layers and alternate ice layers being repeated until the crate is full, usually three tiers sufficing to a crate.

I have found that it does not harm the lettuce, and ensures much better refrigeration, if the ice and lettuce packed are firmly pressed together. While this can be done by hand, I prefer to provide a suitable plunger 12 operated by a rod 13. This plunger fits within the crate and bears down upon the ice and lettuce therein to press it together so that all loose space is worked out of the pack, and so that the wrapper forms a substantially closed container. The pressure applied should be sufficient to compress the heads together without injury. I have used a pressure of five pounds per square inch, but this can be varied.

Since the wrapper is tough, the pressure of the ice does not break the wrapper, while the ice is securely pressed against all portions of the lettuce tier, ensuring that the lettuce is virtually encased in a top sheet of ice. This operation is repeated for each of the alternate layers of lettuce and ice, or else performed upon the crate as a whole after it has been packed. I prefer to press each layer of ice and lettuce so that adequate contact is secured as the crate is packed. This compressing of the ice and lettuce also enables much more ice to be worked into a crate, so that in the more temperate periods of the year it is not necessary to ice the refrigerator car employed as the vehicle in the transcontinental transportation of the products. Finally, the cover 22 is placed on the pack, the cover compressing the pack in the crate and securing it snugly in place. The top bows when sprung into position to provide a constant pressure upon the pack within the crate. This pressure is uniformly distributed over all the heads in the crate, and is therefore not harmful. Instead, it provides an adequate contact between the ice and the wrapped heads, ensuring that refrigeration is maintained so long as the ice lasts in the crate. The lettuce crates are then packed in a car, such as that indicated at 23, which can be a typical refrigerator car including ice bunkers at each end of the car. Instead of a car, any other shipping container can be used.

It has been my observation on the operation of refrigerator cars that the shippers of lettuce have lost sight of the fact that lettuce has a "decomposition heat" or a "respiration heat"; that is, the lettuce is constantly giving off heat due to the life processes still going on within it. This is particularly so with lettuce that is over mature. If a localized high temperature is permissible and can occur in some portions of the refrigerator car, of course this process goes on much more rapidly, since it is one which increasing temperature assists. By providing the lettuce pack of my invention with an adequate ice supply in each crate or available for each crate, and by shielding the lettuce in the moisture permeable wrapper so that moisture passes to the lettuce therein, I have found that this matter of localized high temperature can be adequately cared for.

In the case of lettuce crates containing ice between each layer of shielded heads, the localized temperature problem is adequately cared for by the shielding action of the interposed waterproof material. The packed crates are merely covered with a layer 24 of "top ice," if climatic conditions make this desirable. "Top icing" is well known in the art and requires no explanation here, except to say it includes the spraying of ice particles in an air stream over the packed commodities. It is described in a catalog issued by Wesco Machinery Manufacturing Company and in the Philipps Patent No. 2,113,493 of April 5, 1938, and in the Brady Patent No. 2,123,876 of July 19, 1938.

Figure 1:
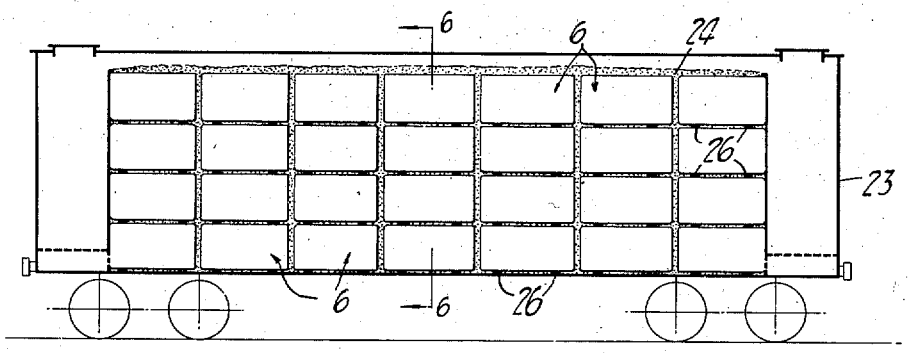
Figure 1 is a longitudinal cross-section taken through a freight car and illustrating a refrigerated pack embodying this invention.
Figure 2:
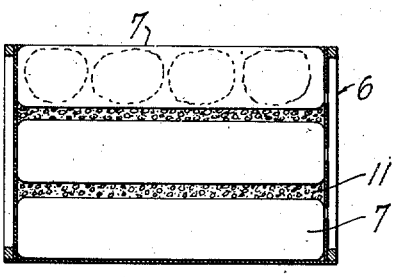
Figures 2, 3 and 4 are diagrammatic views illustrating certain steps in the method of packing lettuce as practiced in accordance with this invention.
Figure 3:
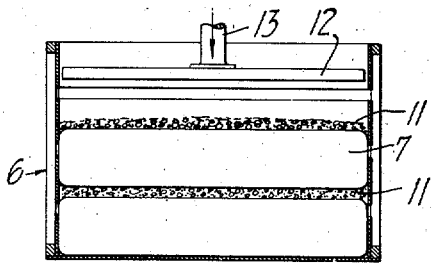
Figure 4:
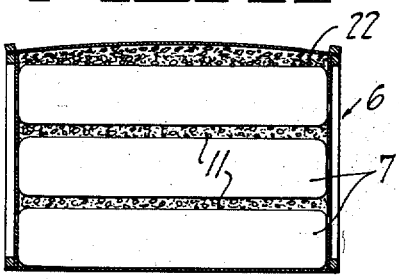

The present invention enables dry packed lettuce to be shipped with adequate refrigeration but without the disadvantages of present practices. In this instance, the crates are placed on their sides (Figure 1) with car strips 26 positioning the crate. Since the crates are lying on their sides, cold water from the melting top ice layer 24 will flow down over each crate. The wrappers or shields act as wicks to draw the cold water down between each layer of lettuce. This ensures adequate refrigeration and moisture control without danger of water logging the lettuce.

When only short distances are to be traversed, or when the atmospheric conditions are suitable, ice need not be used, and the lettuce can be shipped under wholly dry conditions. In this instance, the pack of the present invention is of advantage since it seals in the $CO_2$ gas given off by the lettuce, whether the pack is dry or wet, thus preserving the lettuce by at least decreasing the rate of decomposition as well as retarding bacterial action. Since the top keeps the lettuce compressed, a substantially fluid and gas tight package is provided. The materials previously mentioned adequately supply the characteristics required for this end.

I claim:

1. A method of packing a product for shipment, said method comprising enclosing said product in a flexible, tough, waterproof, moisture permeable material having the capacity of resisting prolonged contact with water without disintegration, arranging such wrapped product in a container, contacting the so wrapped product with a quantity of ice fragments, and confining the ice so as to cause the meltage therefrom to flow over said wrapped product.

2. A shipping package comprising a container, a parcel arranged therein, a quantity of crushed ice distributed in said container in contact with said parcel and maintained by the container in contact with said parcel, said parcel comprising foodstuff wrapped with a tough, flexible, waterproof, moisture permeable wrapper having the capacity of resisting prolonged contact with water without disintegration.

3. A shipping package comprising a crate, a parcel arranged therein, a quantity of crushed ice distributed in said crate in contact with said parcel, and means for maintaining the parcel in contact with said ice, said parcel comprising foodstuff wrapped with vegetable parchment.

4. A shipping package for a vegetable product comprising a crate, layers of said product arranged in said crate, a quantity of ice distributed between the layers, and a shield of a flexible, tough, substantially waterproof and moisture permeable material arranged in said crate between the ice and adjacent faces of said layers of said product to maintain said ice and meltage therefrom out of contact with said product.

5. The method of packing a vegetable product for refrigerated shipment, comprising: interdistributing a quantity of said vegetable product with a quantity of comminuted ice in a shipping container, and protecting said vegetable product from wetting by meltage from said ice, by interposing, during said interdistribution of ice and vegetable product, a shield of flexible, tough, substantially waterproof and moisture-permeable material having an extent adequate to isolate the distributed vegetable product from wetting by meltage as developed.

6. A shipping package for a vegetable product, comprising: a container, a quantity of ice within said container, a quantity of said vegetable product within said container and distributed therein in heat-transferring relationship with said ice, and a flexible, tough sheet of a substantially waterproof, moisture-permeable material interposed between said distributed ice and vegetable product substantially shielding said vegetable product from wetting by ice meltage yet permitting heat and limited moisture-transfer therebetween.

WESLEY W. DODGE.

DISCLAIMER

Re. No. 21,144.—*Wesley W. Dodge*, Oakland, Calif. REFRIGERATING LETTUCE AND THE LIKE. Patent dated July 11, 1939. Disclaimer filed September 6, 1943, by the assignee, *Paterson Pacific Parchment Co.*; the inventor approving.

Hereby enters this disclaimer to claims 4, 5, and 6 in said patent.

[*Official Gazette October 12, 1943.*]